United States Patent
Zhang et al.

(10) Patent No.: US 8,141,205 B2
(45) Date of Patent: Mar. 27, 2012

(54) HINGE MECHANISM AND PORTABLE ELECTRONIC DEVICE USING THE SAME

(75) Inventors: Yu Zhang, Shenzhen (CN); Tian-Fu Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 284 days.

(21) Appl. No.: 12/538,273

(22) Filed: Aug. 10, 2009

(65) Prior Publication Data
US 2010/0125972 A1 May 27, 2010

(30) Foreign Application Priority Data
Nov. 25, 2008 (CN) .......................... 2008 1 0305726

(51) Int. Cl.
*E05F 1/08* (2006.01)
(52) U.S. Cl. .......................... 16/303; 16/284

(58) Field of Classification Search ............ 16/330, 16/303, 284, 285, 295, 307, 312, 313, 280, 16/283, 290; 361/679.06, 679.12, 679.27; 455/90.3, 575.1, 575.3, 575.8; 379/433.12, 379/433.13; 348/373, 333.01, 333.06, 794
See application file for complete search history.

(56) References Cited

U.S. PATENT DOCUMENTS

| | | | |
|---|---|---|---|
| 7,228,596 B2 * | 6/2007 | Kang | 16/330 |
| 7,401,381 B2 * | 7/2008 | Konja et al. | 16/285 |
| 2005/0188504 A1 * | 9/2005 | Duan et al. | 16/330 |
| 2006/0101618 A1 * | 5/2006 | Minami et al. | 16/303 |
| 2006/0218748 A1 * | 10/2006 | Tu et al. | 16/285 |
| 2006/0242793 A1 * | 11/2006 | Tu et al. | 16/284 |
| 2007/0294859 A1 * | 12/2007 | Hsu et al. | 16/330 |

* cited by examiner

*Primary Examiner* — Chuck Y. Mah
(74) *Attorney, Agent, or Firm* — Altis Law Group, Inc.

(57) ABSTRACT

A hinge mechanism comprises a follower, a cam and a first spring. The first spring is spiral, one end of the first spring is mounted to the follower, another end of the first spring is mounted to the cam. The cam rotates relative to the follower about a rotating axis, the first spring is compressed to accumulate elastic force, until the line connecting two ends of the first spring is parallel to the rotating axis where the first spring is mostly compressed to accumulate maximum of the elastic force and the hinge mechanism is in an intermediate state. Once the cam is rotated over the intermediate state, the first spring is expanded under previously accumulated elastic force, which drive the cam continuously rotated relative to the follower.

18 Claims, 6 Drawing Sheets

HINGE MECHANISM AND PORTABLE ELECTRONIC DEVICE USING THE SAME

BACKGROUND

1. Technical Field

The exemplary embodiment relates to hinge mechanisms and, particularly to hinge mechanisms used in portable electronic devices.

2. Description of Related Art

Portable radiotelephones having two housings joined by a type of hinge that allows the housings to fold upon one another are known in the art. Some folding radiotelephones have most of the electronic components installed in one housing called the main housing and fewer electronic components installed in the other housing, called the cover. Other folding radiotelephones may have all electronics components installed in the body with the cover serving only to cover the keypad, or both keypad and display of the phone.

Some known portable cellular radiotelephones utilize a hinge mechanism having a spring, a cam and a follower assembled into a cylindrically hollow can via an open end thereof and held in assemblage by a cap coupled to the can over the open end. The assembled hinge is disposed in a cavity of cover and a cavity of body. This hinge mechanism may be desirable to some radiotelephone manufacturers because it can be purchased as a separate unit, thereby eliminating the steps associated with assembling the hinge during manufacturing. However, the number of parts used is large and the cost of the hinge mechanism is high.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary hinge mechanism and portable electronic device using the hinge mechanism. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
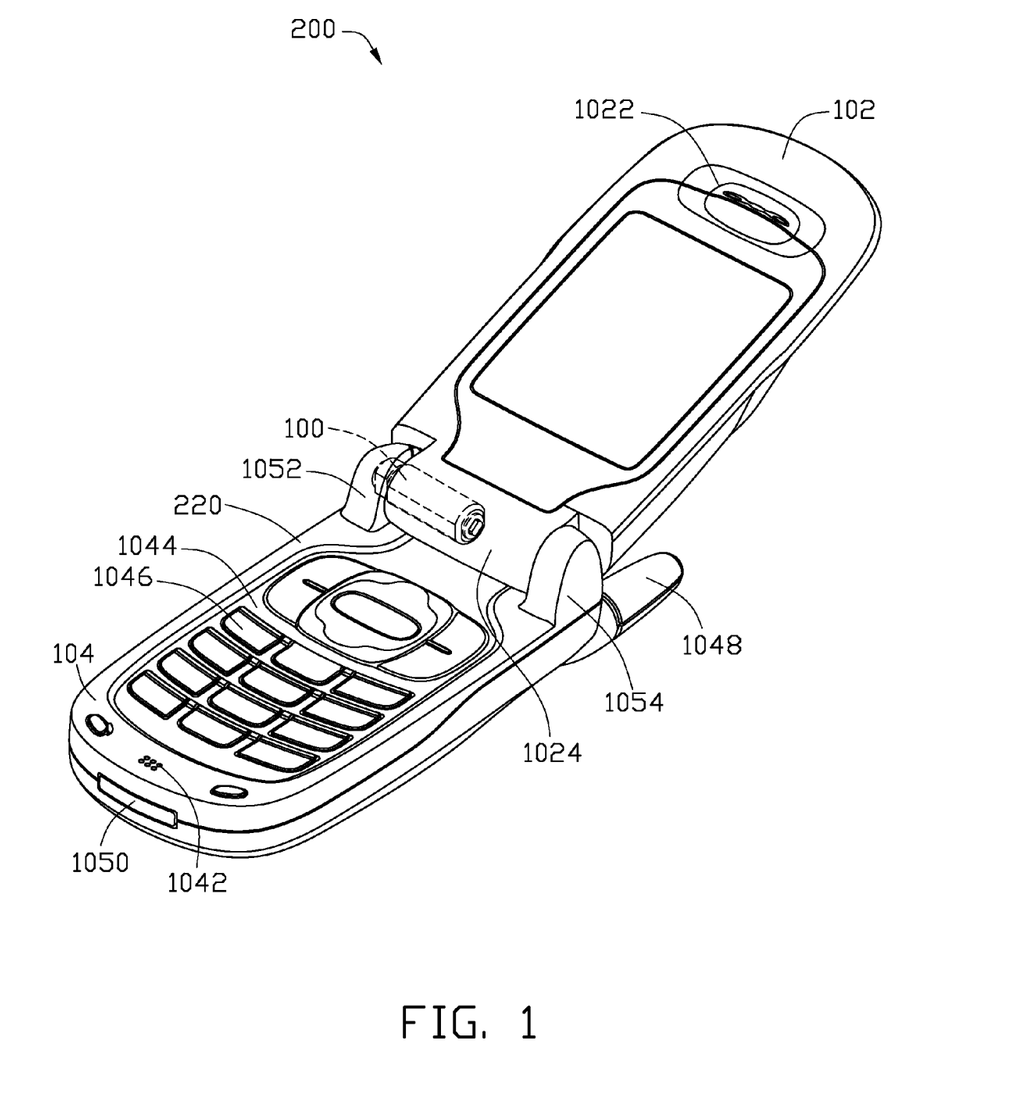
FIG. 1 is schematic view of a portable electronic device in an open position configured in accordance with the exemplary embodiment.

The exemplary embodiment of a foldable, portable electronic device 200 of the exemplary embodiment is shown in FIG. 1. The portable electronic device 200 includes three portions, a cover 102, a body 104 and a hinge mechanism 100 joining the cover 102 to the body 104. FIG. 1 shows the cover 102 in an "open" position such that a user of the portable electronic device 200 can listen via earpiece 1022 and speak into microphone 1042. The body 104 includes a keypad 1044 having a plurality of buttons 1046. The keypad 1044 may also have additional buttons 1046 such as power, function, send, and other buttons associated with communication commands. The body 104 also has an antenna 1048 that enables the portable electronic devices 200 communicating with a base station (not shown) of the portable electronic device system. The body 104 further includes a port 1050 that allows the portable electronic device 200 to connect with external components, for example, a battery charger, external antenna, keypad, speaker or microphone.

When the portable electronic device 200 is assembled, the hinge mechanism 100 is disposed in a barrel portion 1024 of the cover 102. The cover 102, with the hinge mechanism 100 received therein, is rotatably coupled between two knuckles 1052, 1054 of the body 104. The design of hinge mechanism 100 allows the cover 102 to be held in a closed position, and at an obtuse angle in the open position.

Figure 2:
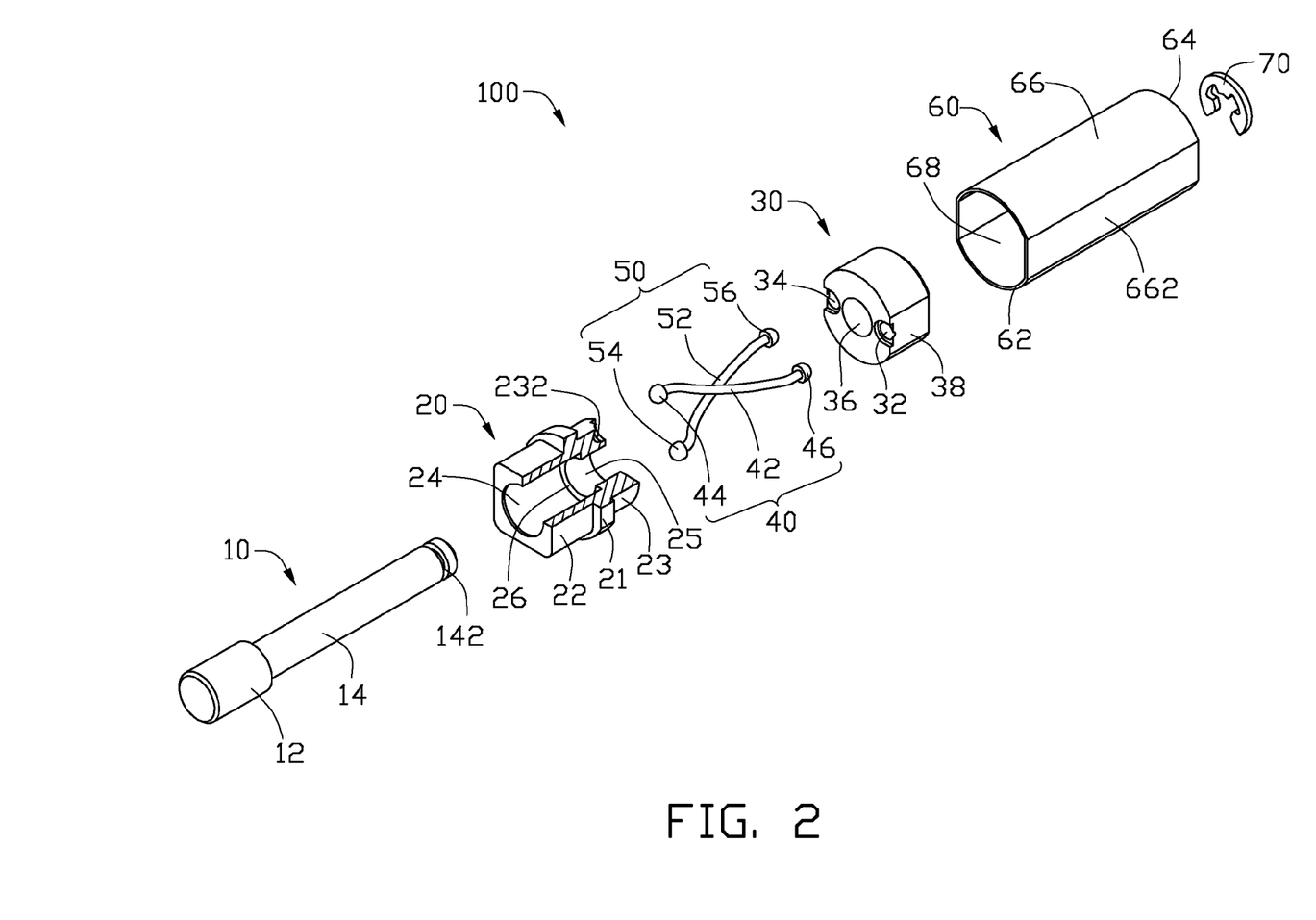
FIG. 2 is an exploded, schematic view of the exemplary embodiment of the hinge mechanism used in the portable electronic device shown in FIGS. 1 and 2.
Figure 3:
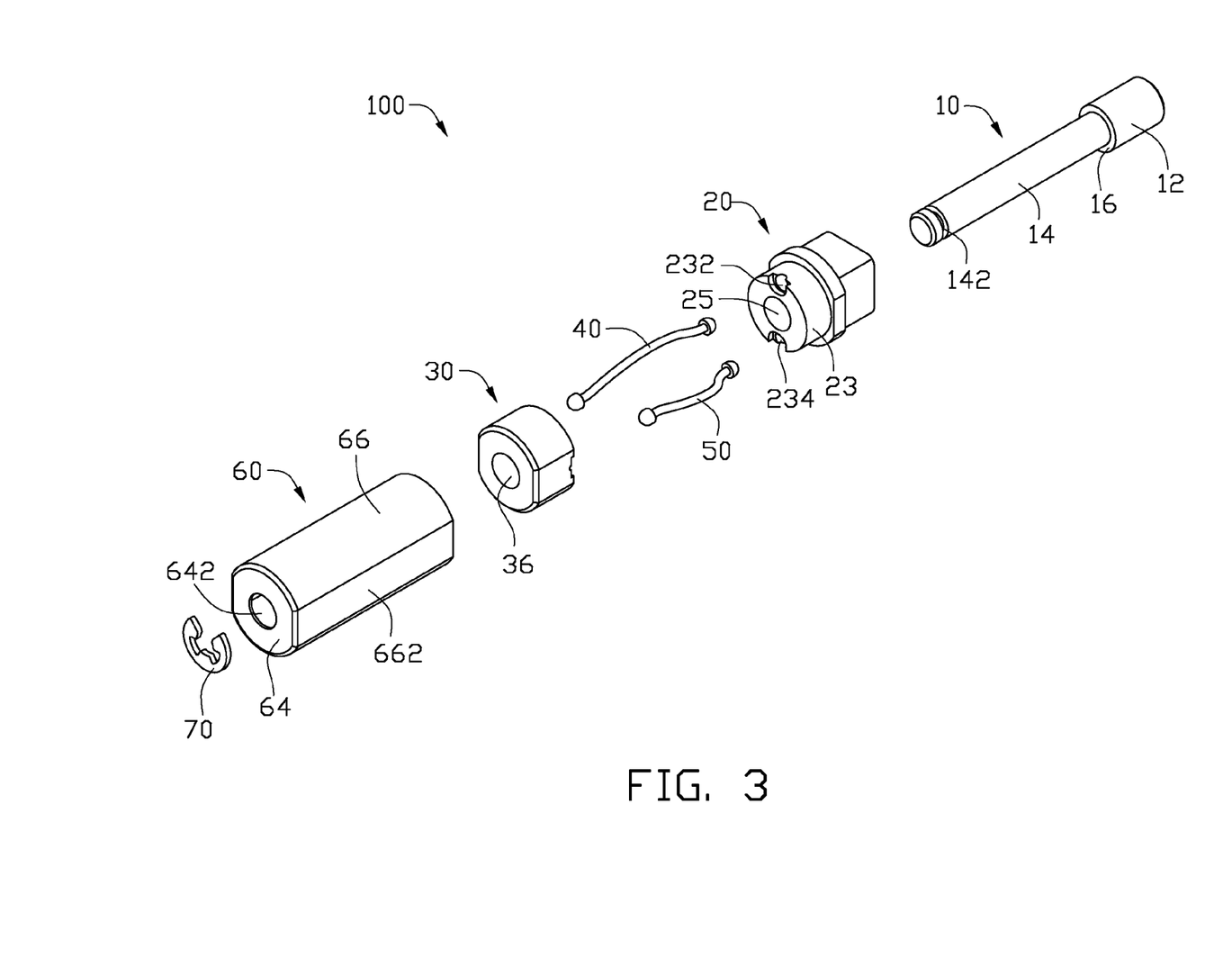
FIG. 3 is similar to FIG. 2, but showing the hinge mechanism in another view.
Figure 4:
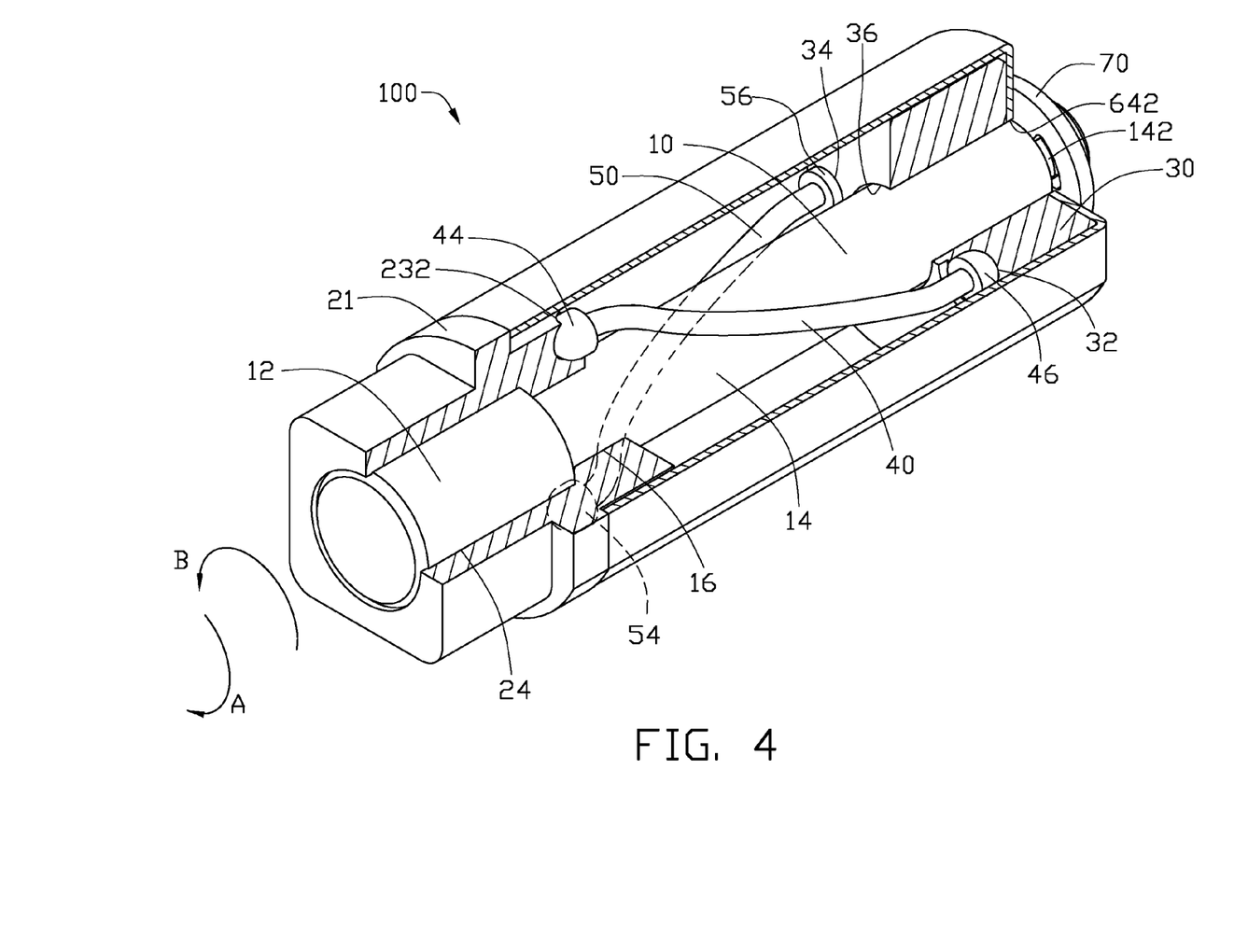
FIG. 4 is an assembled and partially cutaway view of the hinge mechanism shown in FIG. 3.

Referring to FIGS. 2 to 4, the hinge mechanism 100 includes a main shaft 10, a stationary element, such as a follower 20, three moveable elements, such as a cam 30, a first spring 40 and a second spring 50, a cylindrically hollow can 60 and a washer 70. The cam 30, the first spring 40 and the second spring 50 are assembled into the can 60. The follower 20 and the cam 30 are connected together via the first spring 40 and the second spring 50. The main shaft 10 passes through the follower 20, the cam 30 and the can 60 and held in assemblage by the washer 70 latched with the main shaft 10.

The main shaft 10 includes a first cylindrical shaft 12 and a second cylindrical shaft 14 protruding outwardly from one end of the first shaft 12. The first shaft 12 is larger than the second shaft 14, so a first resisting surface 16 (seen FIG. 3) is formed between the first shaft 12 and the second shaft 14. The second shaft 14 has an annular groove 142 radially defined in a distal end thereof and surrounding the second shaft 14. The groove 142 is configured to latch the washer 70 therein.

The follower 20 includes a substantially elliptical resisting portion 21, a retaining portion 22 protruding outwardly from one end of the resisting portion 21, a shaft portion 23 protruding outwardly from another end of the resisting portion 21. The follower 20 has a first hole 24 longitudinally defined in a center of the retaining portion 22 and a second hole 25 longitudinally defined in a center of the shaft portion 23. The first hole 24 has the same shape as the first shaft 12 with a smaller size than the first shaft 12. The first hole 24 is configured to firmly accommodate the first shaft 12. The second hole 25 is communicated with the first hole 24 and has the same shape and size as the second shaft 14. The second hole 25 is configured to accommodate the second shaft 14. The first hole 24 is large than the second hole 25, so a second resisting surface 26 is formed between the first hole 24 and the second hole 25. The second resisting surface 26 is configured to resist against the first resisting surface 16.

The retaining portion 22 mates with an aperture (not shown) in one of the knuckles 1052, 1054 of the body 104 of a portable electronic device 200. The retaining portion 22 is shaped to be received in the aperture and lock the hinge mechanism 100 in place. The shaft portion 23 is a hollow cylinder and rotatably accommodated in the can 60. The follower 20 has a first securing trough 232 and a second securing trough 234 symmetrically defined a distal end thereof facing the cam 30. The first securing trough 232 is configured to latch with the first spring 40. The second securing trough 234 is configured to latch with the second spring 50.

The cam 30 has a third securing trough 32 and a fourth securing trough 34 symmetrically defined in an end thereof facing the follower 20. The third securing trough 32 is configured to latch with the first spring 40. The fourth securing trough 34 is configured to latch with the second spring 50. The cam 30 has a first opening 36 defined therethrough, the second shaft 14 passes through the cam 30 by the first opening 36. The inner diameter of the first opening 36 is slightly larger than the outer diameter of the second shaft 14 such that the second shaft 14 can rotate in the first opening 36 without restraint. The cam 30 has two symmetrical first flat surfaces 38 longitudinally formed an outer peripheral surface thereof. The first flat surfaces 38 are configured to mate with the can 60 so that the cam 30 rotates with the can 60.

The first spring 40 includes a first spiral main body 42, a first securing portion 44 protruding one end thereof facing the follower 20 and a second securing portion 46 protruding another end there of facing the cam 30. The first securing portion 44 and the second securing portion 46 are both semicircular. The first securing portion 44 is rotatably latched in the first securing trough 232, and the second securing portion 46 is rotatably latched in the third securing trough 32.

The second spiral spring 50 includes a spiral second main body 52, a third securing portion 54 protruding one end thereof facing the follower 20 and a fourth securing portion 56 protruding another end there of facing the cam 30. The third securing portion 54 and the fourth securing portion 56 are both semicircular. The third securing portion 54 is rotatably latched in the second securing trough 234, and the fourth securing portion 56 is rotatably latched in the fourth securing trough 34.

The can 60 is a barrel including an open end 62, a partially closed end 64 and a peripheral wall 66 connecting the open end 62 and the partially closed end 64. The open end 62, the partially closed end 64 and the peripheral wall 66 cooperatively enclose a space 68. The space 68 is configured for accommodating the shaft portion 23 of the follower 20, the first spring 40, the second spring 50 and the cam 30. The cross-sectional of the space 68 has the same shape and size as that of the cam 30. The can 60 has two symmetrical second flat surfaces 662 longitudinally formed on the peripheral wall 66. The second flat surfaces 662 are configured to mate with the first flat surface of the cam 30 so that the can 60 rotates with the cam 30.

The distance between the two second flat surfaces 662 is slightly larger than the diameter of the shaft portion 23 so that the shaft portion 23 can 60 rotate in the space 68 without restraint. The partially closed end 64 has a second opening 642 defined therethrough, the second shaft 14 passes through the partially closed end 64 by the second opening 642.

In assembling the hinge mechanism 100, firstly, the first securing portion 44 of the first spring 40 is latched in the first securing trough 232, and the second securing portion 46 of the first spring 40 is latched in the third securing trough 32, so the first spring 40 is located between the follower 20 and the cam 30. Secondly, the third securing portion 54 of the second spring 50 is latched in the second securing trough 234, the fourth securing portion 56 of the second spring 50 is latched in the fourth securing trough 34, so the second spring 50 is located between the follower 20 and the cam 30. The follower 20, the first spring 40, the second spring 50 and the cam 30 is assembled into the space 68 of the can 60 via the open end 62 thereof. The first hole 24, the second hole 25, the first opening 36 and the second opening 642 are aligned. The main shaft 10 passes through the first hole 24, the second hole 25, the first opening 36 and the second opening 642, until the first resisting surface 16 of the main shaft 10 resist against the second resisting surface 26 of the follower 20. At this time, the first spring 40 and the second spring 50 are wound around the second shaft 14. The resisting portion 21 of the follower 20 is resisted against the open end 62 of the can 60. The groove 142 of the second shaft 14 extend outwardly the partially closed end 64 from the second opening 642. Then, the washer 70 is latched into the groove 142, so yields an assembled hinge mechanism 100.

In use, the can 60 of the hinge mechanism 100 is received in slots (not shown) formed on the interior surface the barrel portion 1024 of the cover 102 so that the can 60 rotates with the cover 102 as the cover 102 is moved between the open and closed position with respect to the body 104. The follower 20 of the hinge mechanism 100 is locked into one of the knuckles 1052, 1054 of the body 104 so that the follower 20 rotates with the body 104, and does not rotate when the cover 102 is moved between the open and closed positions with respect to the body 104. When the cover 102 is in closed state, referring to FIG. 4, the first spring 40 and the second spring 50 is slightly compressed, so both have a tendency to expand. Thereby, the cam 30 have a tendency to rotate relative to the follower 20 in the direction of arrow A shown in FIG. 4. As mentioned above, the cam 30 rotates with the can 60 which rotates with the cover 102, and the follower 20 rotate with the body 104, so that the cover 102 is firmly attached to the body 104.

Figure 5:
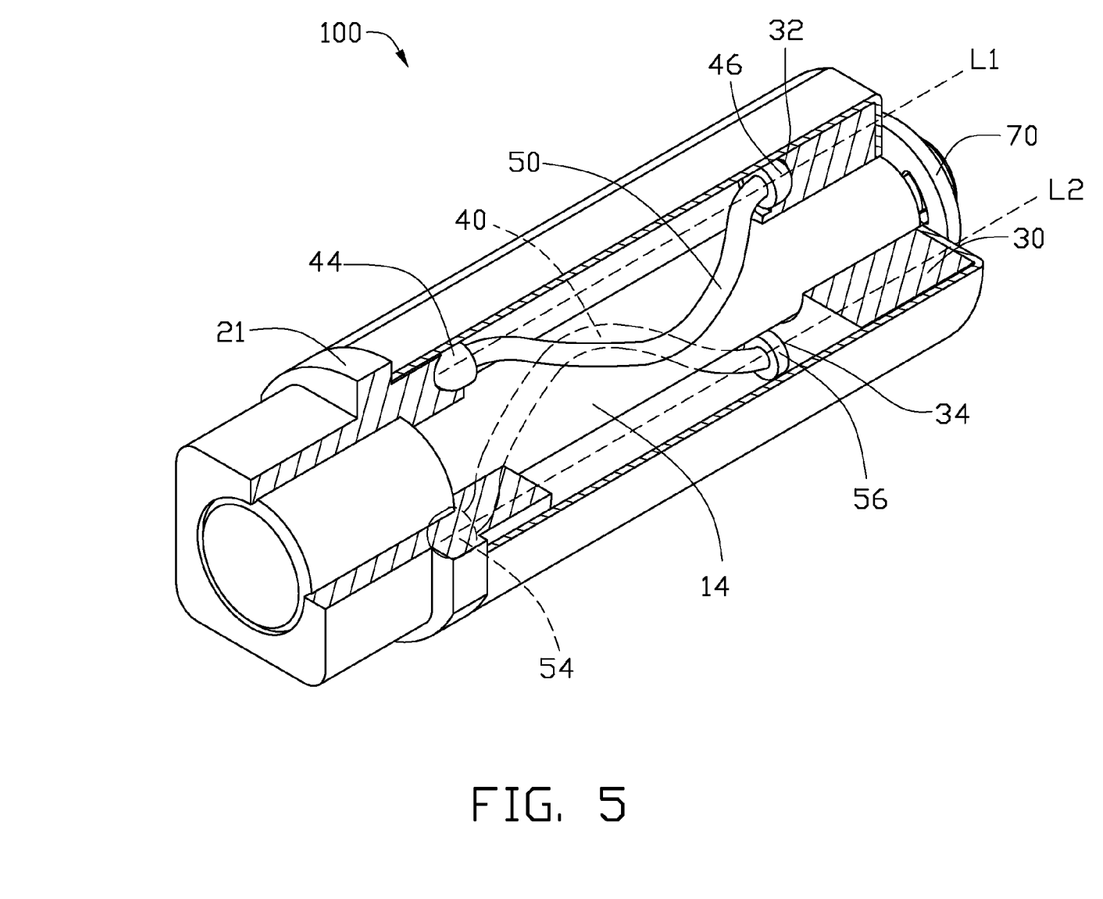
FIG. 5 is a schematic view of which a cam rotates relative to a follower in an intermediate state.
Figure 6:
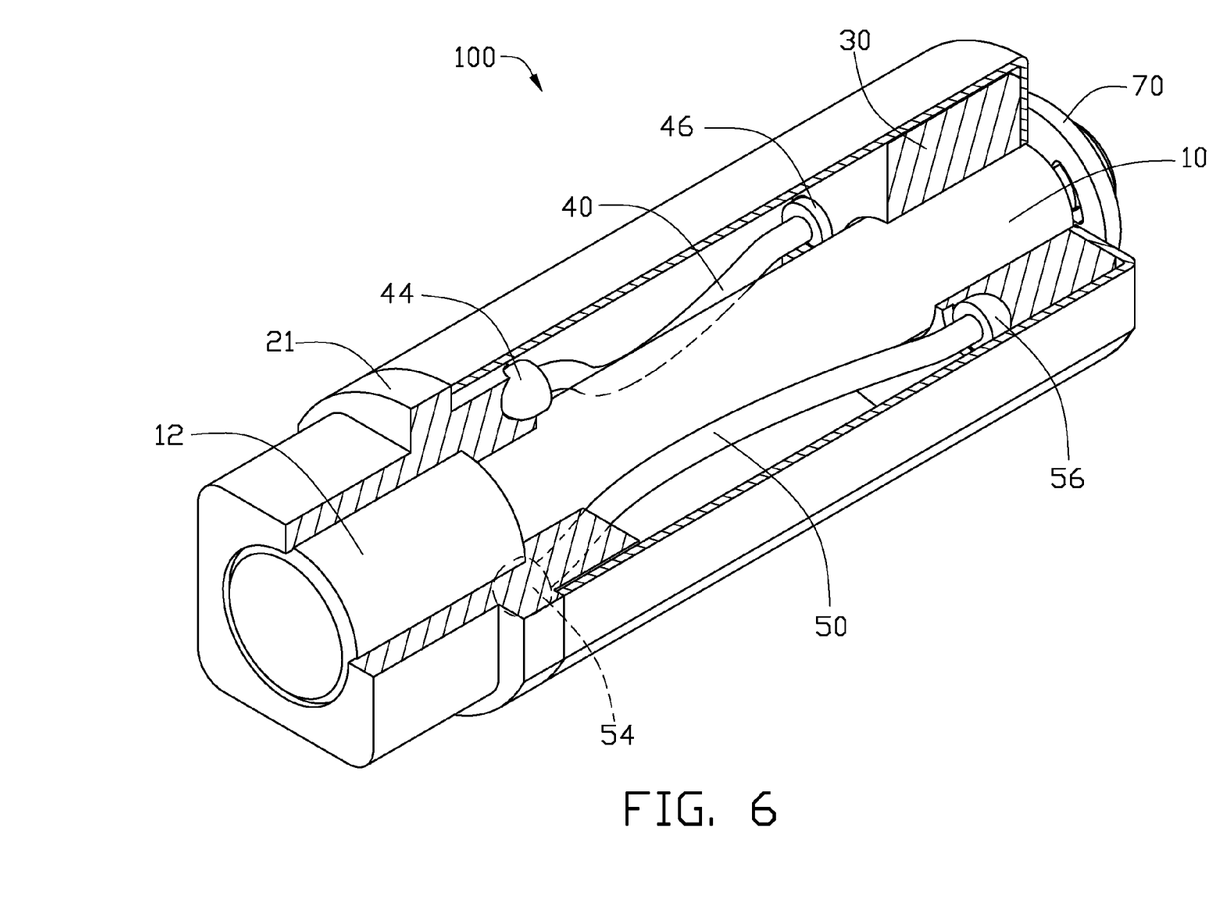
FIG. 6 is a schematic view of the hinge mechanism shown in FIG. 5 in an open position.

Referring to FIGS. 4 to 6, a force is exerted on the can 60 to make can 60 and the cam 30 rotate relative to the follower 20 in the direction of arrow B shown in FIG. 4. As the cam 30 rotates, the distance between the first securing portion 44 and the second securing portion 46 and the distance between the third securing portion 54 and the fourth securing portion 56 are gradually shortened, with the first spring 40 and the second spring 50 being compressed and twisted to accumulate elastic force. Once the line L1 connecting the first securing portion 44 with the second securing portion 46 is parallel to the second shaft 14, the first spring 40 is mostly compressed to accumulate maximum of the elastic force. Simultaneously, the line L2 connecting the third securing portion 54 with the fourth is parallel to the second shaft 14 also, the second spring 50 is mostly compressed to accumulate maximum of the elastic force too. At this stage, the hinge mechanism 100 is in an intermediate state (seen FIG. 5).

The can 60 is continuously rotated relative to the follower 20 in the direction of arrow B until the can 60 is rotated over the intermediate state, the first spring 40 and the second spring 50 expand under previously accumulated elastic force, which drive the can 60 and the cam 30 continuously rotated in the direction of arrow B until the hinge mechanism 100 is in a fully open state (seen FIG. 6). At this time, the first spring 40 and the second spring 50 are slightly compressed, so both of which have a tendency to expand. With a result the cam 30 trends to rotate relative to the follower 20 in the direction of arrow B shown in FIG. 4. As mentioned above, the cam 30 rotates with the can 60 which rotates with the cover 102, and the follower 20 rotate with the body 104, so that the cover 102 is firmly located in open state.

It is to be understood, the second spring 50 can be omitted when the first spring 40 can provide enough force to make the cover 102 rotate relative to the body 104.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge mechanism comprising:
 a follower;
 a cam; and
 a first spring, the first spring being spiral, one end of the first spring mounted to the follower, another end of the first spring mounted to the cam so the follower is retained to the cam by the first spring;
 a can, the can including an open end, a partially closed end and a peripheral wall connecting the open end and the partially closed end, the open end, the partially closed end and the peripheral wall corporately enclosing a space, the follower, the first spring, and the cam accommodated in the space;
 a main shaft, the main shaft passing through the cam and the follower;
 wherein when the cam rotates relative to the follower about the main shaft, the first spring is compressed to accumulate elastic force, until the line connecting two ends of the first spring is parallel to the rotating axis where the first spring is mostly compressed to accumulate the maximum elastic force and the hinge mechanism is in an intermediate state; once the cam is rotated past the intermediate state, the first spring expands under the accumulated elastic force, driving the cam to continue rotating relative to the follower.

2. The hinge mechanism of claim 1, wherein the cam rotates with the can, the follower rotatably accommodated in the space.

3. The hinge mechanism of claim 1, wherein the hinge mechanism further includes a washer, the follower, the cam the can held in assemblage by the washer latched with the main shaft.

4. The hinge mechanism of claim 3, wherein the main shaft includes a first shaft and a second shaft protruding outwardly from one end of the first shaft, the main shaft has a first resisting surface formed between the first shaft and the second shaft, the follower defines a first hole for accommodating the first shaft and a second hole for accommodating the second shaft, the first hole and the second hole are communicated and a second resisting surface is formed therebetween, the second resisting surface resists against the first resisting surface.

5. The hinge mechanism of claim 4, wherein the second shaft has a groove defined at a distal end thereof, the cam has a first opening defined therethrough, the can has a second opening defined therethrough, the second shaft passes through the first opening and the second opening in turn to expose the groove out of the can, the washer is latched within the groove.

6. The hinge mechanism of claim 1, wherein the follower includes a resisting portion, a retaining portion protruding one end of the resisting portion and a shaft portion protruding another end of the resisting portion, the resisting portion resists against the open end of the can, the shaft portion is rotatably accommodated in the space of the can.

7. The hinge mechanism of claim 1, wherein the follower has a first securing trough defined an end thereof facing the cam, the cam has a second securing trough defined an end thereof facing the follower, the first spring has a first securing portion and a second securing portion respectively formed two ends thereof, the first securing portion is accommodated in the first securing trough, the second securing portion is accommodated in the second securing trough.

8. The hinge mechanism of claim 7, wherein the hinge mechanism further includes a second spring, the second spring has the same shape and size as the first spring, one end of the second spring is mounted to the follower, another end of the second spring is mounted to the cam.

9. The hinge mechanism of claim 8, wherein the follower further has a third trough defined the end facing the cam symmetrical with the first trough, the cam further has a fourth trough defined the end facing follower symmetrical with the second trough, the second spring has a third securing portion and a fourth securing portion respectively formed two ends thereof, the third securing portion is accommodated in the third securing trough, the fourth securing portion is accommodated in the fourth securing trough.

10. A portable electronic device, comprising:
 a body section;
 a cover section; and
 a hinge assembly rotatably hinging the body section and the cover section, the hinge assembly comprising:
 a follower;
 a cam; and
 a first spring, the first spring being spiral, one end of the first spring rotatably latched to the follower, another end of the first spring rotatably latched to the cam;
 a can, the can including an open end, a partially closed end and a peripheral wall connecting the open end and the partially closed end, the open end, the partially closed end and the peripheral wall corporately enclosing a space, the follower, the first spring, and the cam accommodated in the space; and
 a main shaft, the main shaft passing through the cam and the follower;
 wherein when the cam rotates relative to the follower about the main shaft, the first spring is compressed to accumulate elastic force, until the line connecting two ends of the first spring is parallel to the rotating axis where the first spring is mostly compressed to accumulate the maximum elastic force and the hinge mechanism is in an intermediate state; once the cam is rotated past the intermediate state, the first spring is expanded under the accumulated elastic force, driving the cam to continue rotating relative to the follower.

11. The portable electronic device of claim 10, wherein the cam rotates with the can, the follower rotatably accommodated in the space.

12. The portable electronic device of claim 10, wherein the hinge mechanism further includes a washer, the follower, the cam and the can held in assemblage by the washer latched with the main shaft.

13. The portable electronic device of claim 12, wherein the main shaft includes a first shaft and a second shaft protruding outwardly from one end of the first shaft, the main shaft has a first resisting surface formed between the first shaft and the second shaft, the follower defines a first hole for accommodating the first shaft and a second hole for accommodating the second shaft, the first hole and the second hole are communicated and a second resisting surface is formed therebetween, the second resisting surface resists against the first resisting surface.

14. The portable electronic device of claim 13, wherein the second shaft has a groove defined at a distal end thereof, the cam has a first opening defined therethrough, the can has a second opening defined therethrough, the second shaft passed through the first opening and the second opening in turn to expose the groove out of the can, the washer is latched within the groove.

15. The portable electronic device of claim 10, wherein the follower includes a resisting portion, a retaining portion protruding one end of the resisting portion and a shaft portion protruding another end of the resisting portion, the resisting portion resists against the open end of the can, the shaft portion is rotatably accommodated in the space of the can.

16. The portable electronic device of claim 10, wherein the follower has a first securing trough defined an end thereof facing the cam, the cam has a second securing trough defined an end thereof facing the follower, the first spring has a first securing portion and a second securing portion respectively formed two ends thereof, the first securing portion is accommodated in the first securing trough, the second securing portion is accommodated in the second securing trough.

17. The portable electronic device of claim 16, wherein the hinge mechanism further includes a second spring, the second spring has the same shape and size as the first spring, one end of the second spring is mounted to the follower, another end of the second spring is mounted to the cam.

18. The portable electronic device of claim 17, wherein the follower further has a third trough defined the end facing the cam symmetrical with the first trough, the cam further has a fourth trough defined the end facing follower symmetrical with the second trough, the second spring has a third securing portion and a fourth securing portion respectively formed two ends thereof, the third securing portion is accommodated in the third securing trough, the fourth securing portion is accommodated in the fourth securing trough.

* * * * *